Oct. 24, 1933.  A. URFER ET AL  1,932,330
AIRCRAFT STEERING SYSTEM
Filed April 6, 1932  6 Sheets-Sheet 2
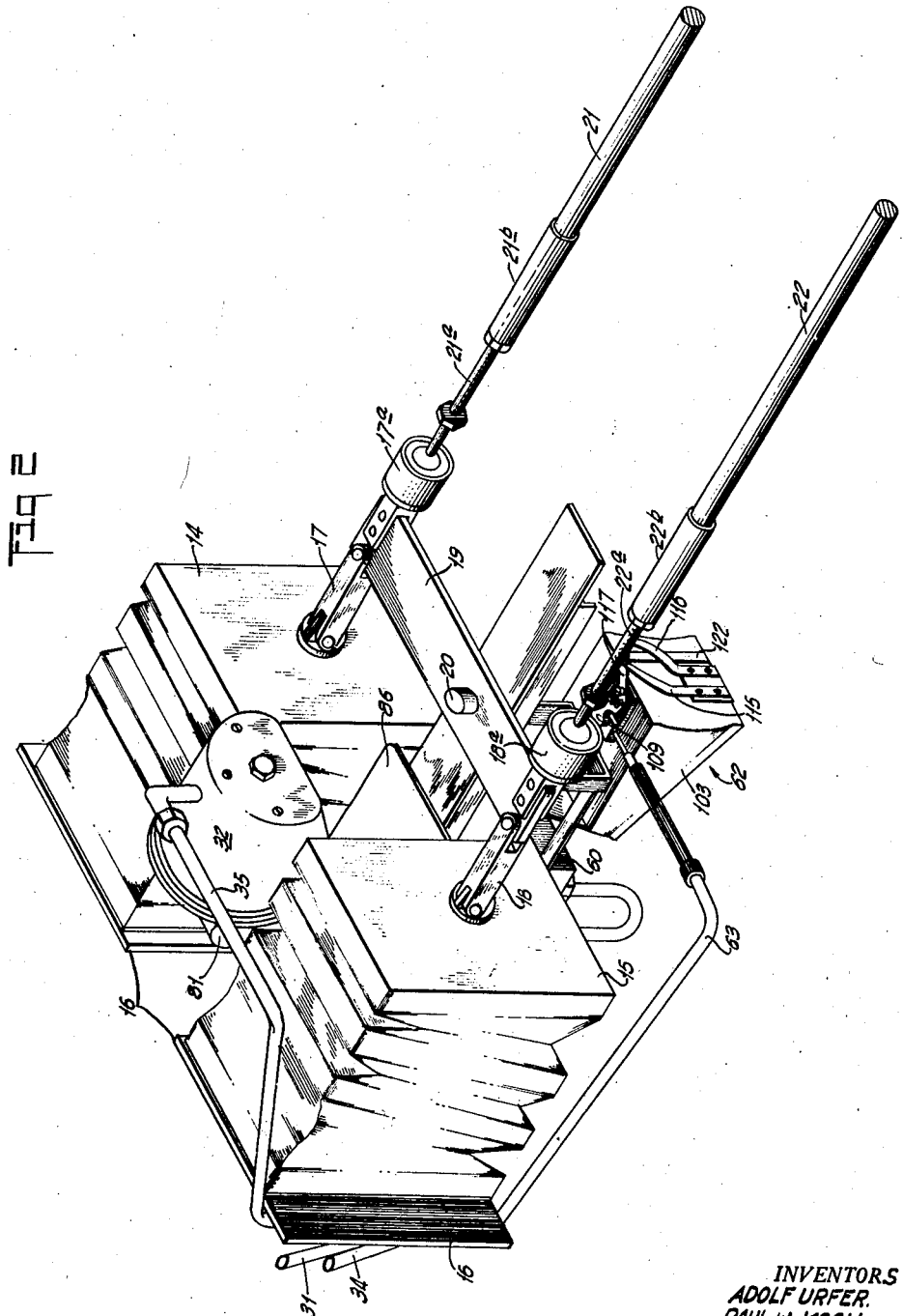
INVENTORS
ADOLF URFER.
PAUL W. KOCH.
BY Stephen Ceratvik.
ATTORNEY.

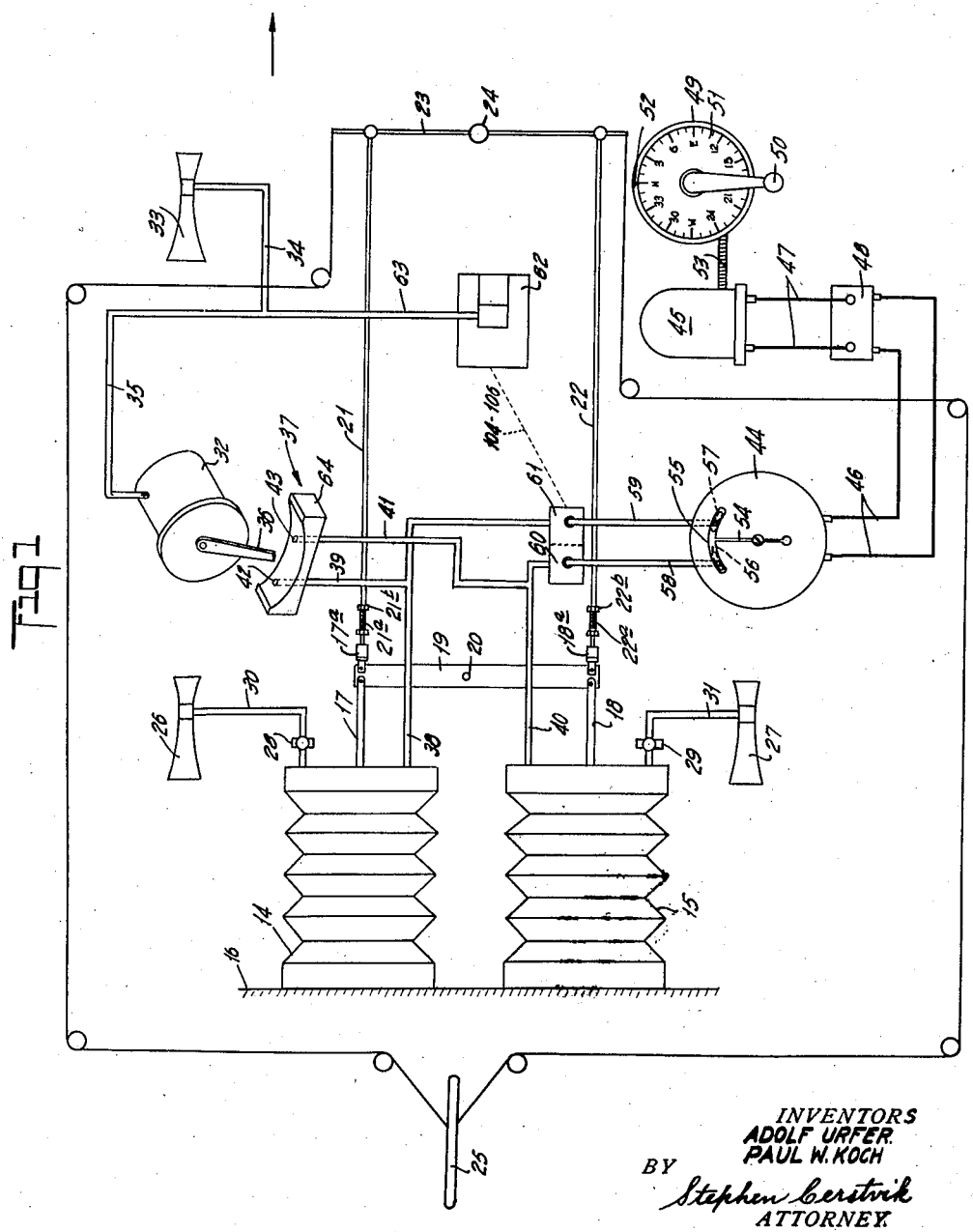

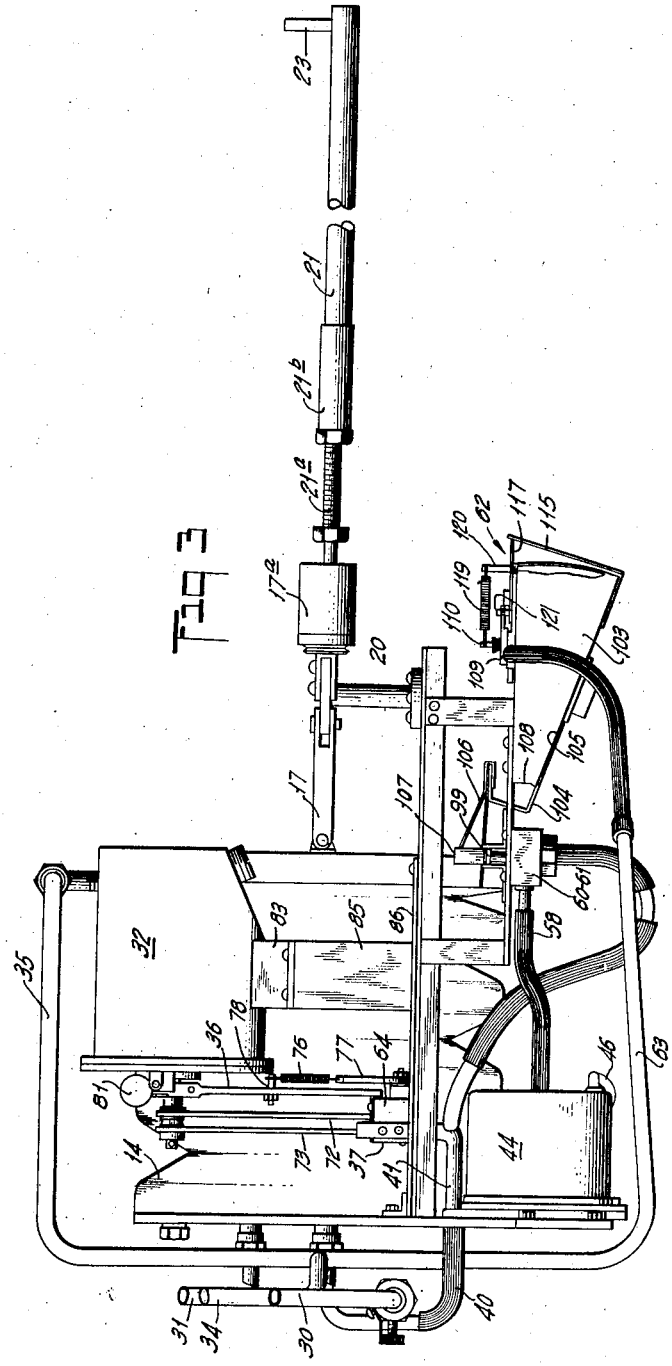

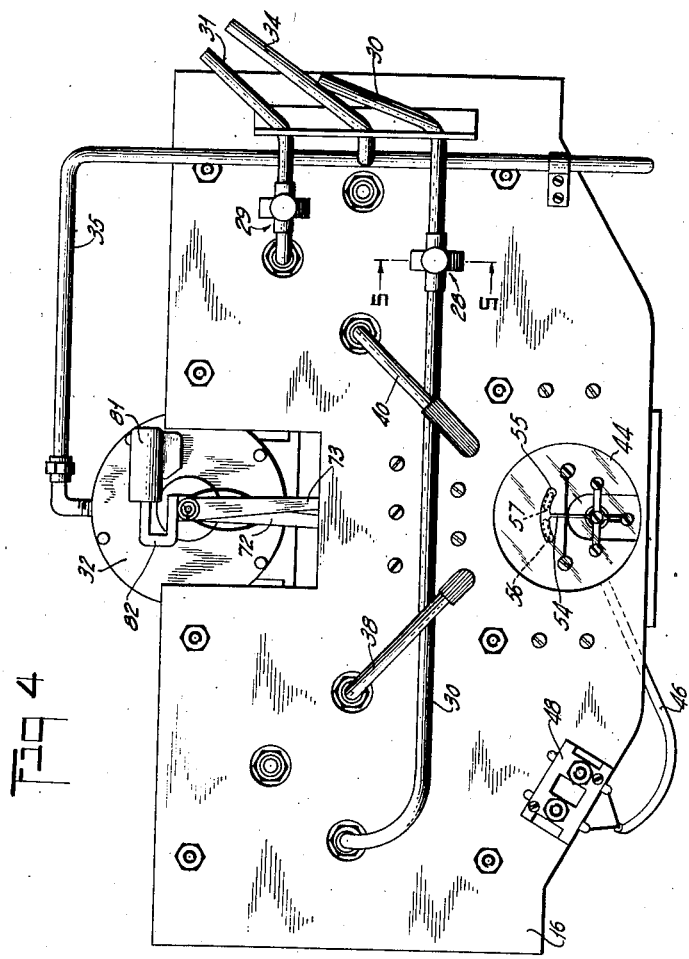
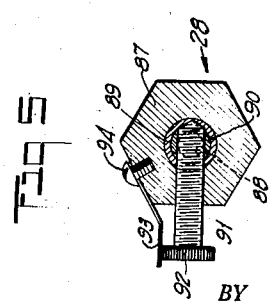

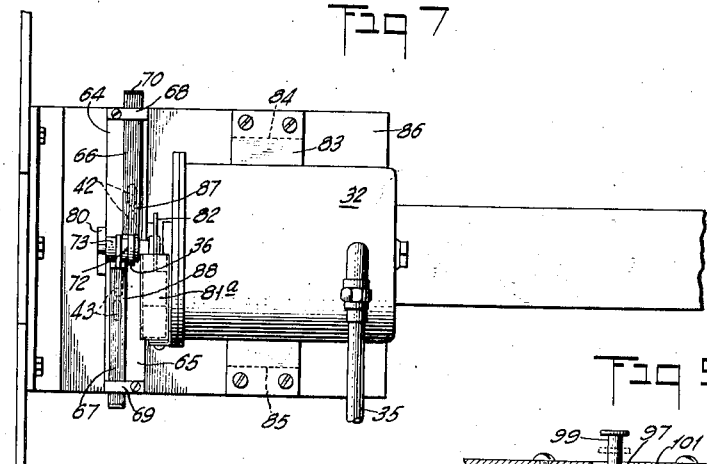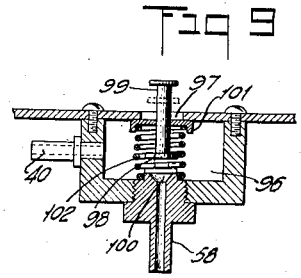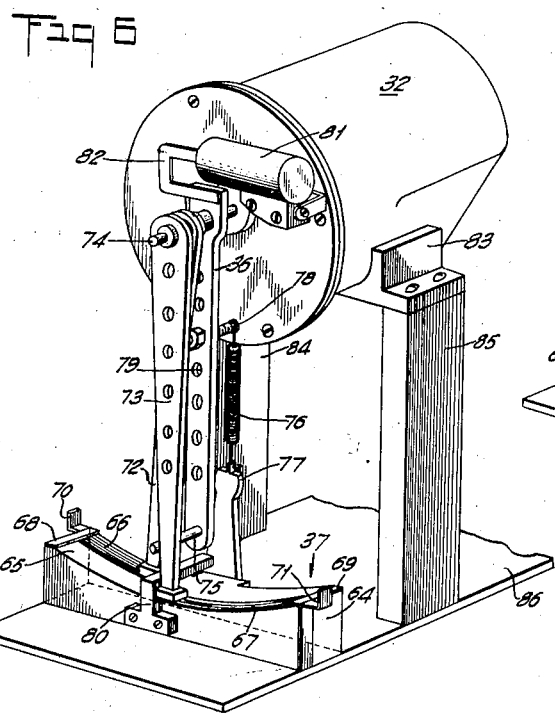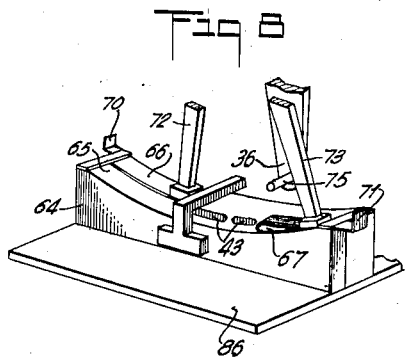

Oct. 24, 1933.  A. URFER ET AL  1,932,330
AIRCRAFT STEERING SYSTEM
Filed April 6, 1932  6 Sheets-Sheet 6
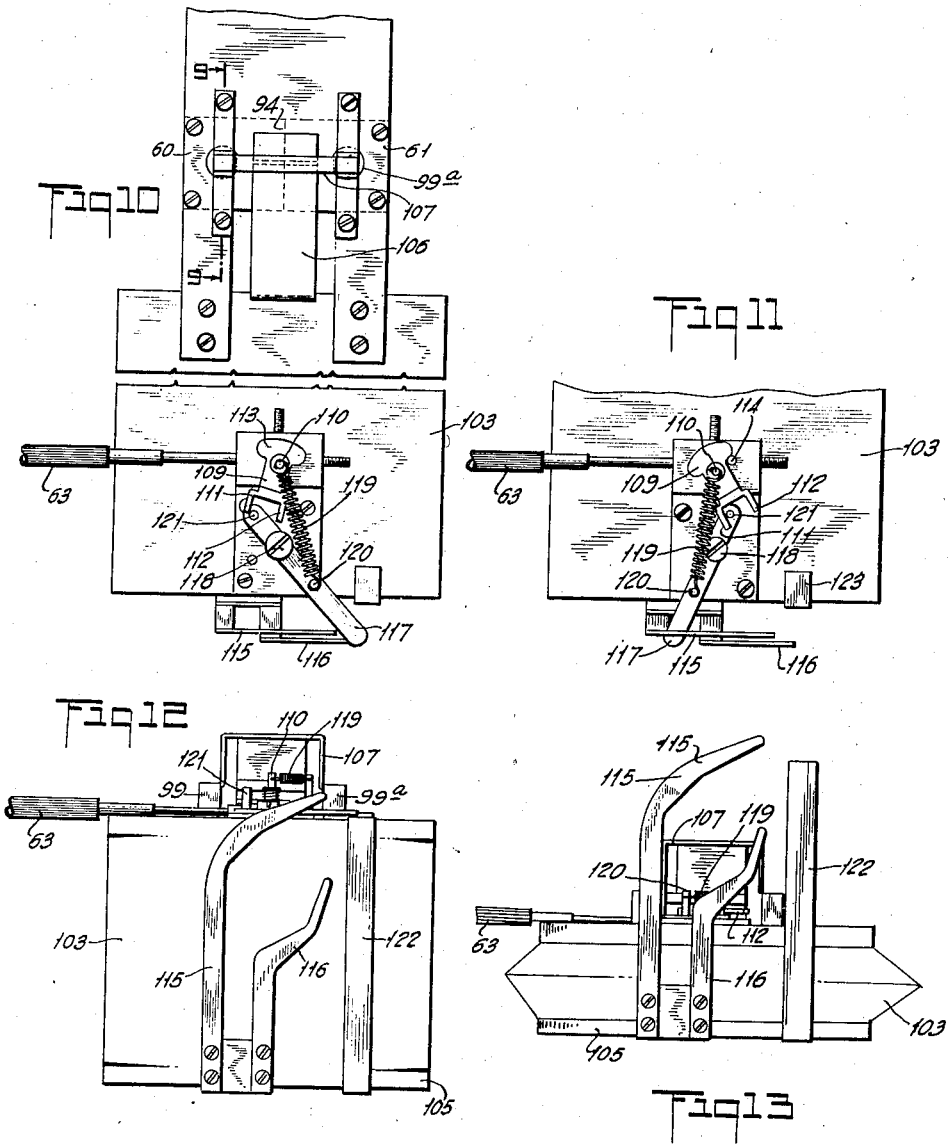
INVENTORS
ADOLF URFER.
PAUL W. KOCH.
BY Stephen Gerstvik.
ATTORNEY.

Patented Oct. 24, 1933

1,932,330

UNITED STATES PATENT OFFICE 1,932,330

AIRCRAFT STEERING SYSTEM

Adolf Urfer, Richmond Hill, and Paul W. Koch, Brooklyn, N. Y., assignors to Bendix Aviation Corporation, South Bend, Ind., a corporation of Delaware Application April 6, 1932. Serial No. 603,646

39 Claims. (Cl. 244—29)

The present invention relates to steering systems and devices and more particularly to a steering system or directional stabilizing system adapted for use on aircraft to automatically maintain the latter on a predetermined path or compass course.

In practically all automatic steering systems of the above general type there is provided a control unit and a servo unit, the latter being actuated by the former in response to a deviation of a craft from a course for operating the rudder of the craft to return the latter to its course. Heretofore, in such systems a compass or a gyroscopic turn responsive device was used to control the servo unit but these systems did not operate very successfully because of the tendency of the apparatus to cause the craft to overswing beyond the course with the consequence that the craft continuously yawed or oscillated about its course.

The value of an efficient automatic steering system depends upon its capability to anticipate the deviation of a craft from its course and then to immediately affect the rudder of said craft in substantially the same manner as a pilot or helmsman operates it to prevent overswinging, i. e., to check the rudder at the right moment so that when the craft is approaching its course it will reduce its swing and end the swing completely when the craft is exactly on the course thereby preventing oscillation or continual yawing of the craft about its course.

It is believed to be apparent to those skilled in the art to which the present invention appertains that the angular motion of a craft such as an airplane or ship is a function of two factors, namely, the angle of departure and the rate of such departure. The angle of departure is determined by a compass of any suitable type, such as the usual magnetic compass or the gyro-compass, and the rate of departure or angular velocity is made perceptible or can be determined by a gyroscopic turn responsive instrument such as the usual turn indicator employed on aircraft for indicating right and left turns thereon. Therefore, if these two factors of angle and angular rate of departure can be combined to operate the rudder of a craft in such a manner as to control it in accordance with the resultant of these factors the craft will be controlled effectively and without oscillation about its course. In fact a deviation will be so completely anticipated that the craft will be substantially prevented from departing from its predetermined or set course.

Accordingly one object of the present invention is to provide novel means whereby the action of a rudder of a craft, such as an airplane or ship, is controlled automatically in the same manner as when controlled by a pilot or helmsman to keep the craft on a predetermined course.

Another object of the invention is to provide a novel steering system embodying means responsive to the rate of departure of a craft from its course for controlling the rudder of said craft in such a manner that a departure will be anticipated, and direction responsive means for correcting the action of the rate responsive means on the rudder whereby oscillation of the craft in return to its course is prevented.

Another object is to provide a novel directional stabilizing system particularly suitable for automatically steering an aircraft, and embodying a fluid pressure operated servo unit controlled by both a directional device and a rate of turn device for operating the rudder of the craft in accordance with the angle of departure from a predetermined course and with the rate of such departure whereby overswinging of the craft is substantially eliminated.

Another object is to provide in a system of the above type, novel means whereby the corrective action of the directional device is introduced into the system intermittently and periodically and combined with the action of the turn responsive device to prevent overswinging of the craft controlled thereby.

A further object of the invention is to provide a fluid pressure operated automatic steering system for maintaining a craft on a predetermined course and embodying novel valve means operated by a turn responsive device for controlling a servo unit operating the rudder of a craft, and a novel automatic timing device for periodically introducing a correction factor which is a function of the angle of departure of the craft off its course and which is determined by a directional device such, for example, as a compass.

Still another object of the invention is to provide a novel fluid pressure operated automatic steering system which is small, compact, and involves relatively few parts thereby rendering it particularly suitable for use on aircraft where space is limited and lightness of weight of the apparatus is of greatest importance. Another reason why the apparatus embodying the present invention is particularly suitable for use on aircraft is that it is operated by suction, the availability of which is believed to be obvious on an aircraft by the use of Venturi tubes.

The above and other objects and advantages of the invention will appear more fully hereinafter from a consideration of the detailed description which follows, taken together with the accompanying drawings wherein is illustrated one embodiment of the invention. It is expressly understood, however, that the drawings are for the purpose of illustration and description only and are not designed as a definition of the limits of the invention, reference being had for this purpose to the appended claims.

In the drawings wherein like reference characters refer to like parts throughout the several views, Fig. 1 is a schematic arrangement illustrating the relation and manner of operation of the various elements of the steering system and apparatus embodying the present invention;

Fig. 2 is a perspective view of one practical form of apparatus embodying the present invention;

Fig. 3 is a side elevation of the apparatus shown in Fig. 2 with one of the bellows removed;

Fig. 4 is a rear view;

Fig. 5 is a detail sectional view of a type of valve used for controlling the amount of suction supplied by the servo unit;

Fig. 6 is a perspective view of the novel valve means employed in the apparatus embodying the present invention;

Fig. 7 is a top plan view of the device shown in Fig. 6;

Fig. 8 is a detail perspective view, with parts broken away, illustrating the manner of operation of the novel valve shown in Fig. 6;

Fig. 9 is a detail section of the valve mechanism controlled by the automatic timing mechanism for introducing the compass correction.

Fig. 10 is a plan view of the automatic timing mechanism in a position in which the valve controlled thereby is open;

Fig. 11 is a similar view in which the valve is closed;

Fig. 12 is a front elevation of the device shown in Fig. 10; and

Fig. 13 is a view similar to Fig. 12 showing the timing mechanism in an operative position.

The automatic steering system or directional stabilizing system and apparatus embodying the present invention comprises a fluid pressure operated or pneumatic servo unit operatively connected to the rudder of the craft and controlled by two main elements, namely, an instrument responsive to changes in the direction of the motion of the craft such as a compass, and an instrument responsive to variations in the angular velocity with which such changes take place, such as a gyroscopic turn indicator, the respective actions of both instruments being combined in the servo unit to control the action of the rudder, the resultant effect of the servo unit on the rudder being determined by the extent to which the influence of the compass or that of the turn indicator enters into the action of the apparatus.

In order to permit the turn indicator to respond to very small forces a novel type of valve is provided for controlling the servo unit by said turn indicator, namely a valve which is free from reaction.

Also in order to develop sufficient force for introducing the factor of the angle of departure, an electrically operated repeating compass is employed of the type disclosed in the copending application of Adolf Urfer, Serial No. 470,451 filed July 24, 1930, in which the repeater element is a galvanometer energized from a master compass embodying an electrolytic control unit.

The servo unit comprises a pair of bellows operatively connected to the control member or rudder of the craft which is to be steered, and the interior of said bellows is connected to a suction supply and arranged so that normally the atmosphere tends to compress both bellows equally, thus keeping the rudder in a central position, and upon operation of the turn indicator and/or the compass, due to deviation off the course, a leak in one or the other of the bellows is opened to the atmosphere thereby causing its associated bellows to collapse and thus operating the rudder, i. e., when one of the bellows is opened through a leak to the atmosphere, its force acting on the rudder decreases and the other bellows tends to operate the rudder.

Referring to the drawings and more particularly to the schematic arrangement of Fig. 1, the embodiment of the invention illustrated therein comprises the bellows 14 and 15 carried by a fixed support 16 which is rigidly secured to some part of the craft to be steered. The bellows 14 and 15 are connected through pull rods 17 and 18, respectively, to an auxiliary rudder bar 19 pivoted at 20 which in turn is connected through the usual rudder control cables 21 and 22 to the main rudder bar 23 pivoted at 24 and which controls the rudder 25. The pull rods 17 and 18 are provided at the auxiliary rudder bar end with ball type universal joints 17a and 18a respectively. The joints are connected to the cables 21 and 22 by means of externally threaded members 21a and 22a which engage co-operating internally threaded members 21b and 22b respectively. In this manner the distance between the auxiliary rudder bar 19 and the main rudder bar 23 can be adjusted until the craft moves along a straight course with the control apparatus not operating.

The system is illustrated as being employed on an aircraft although it is obvious that the same may be adapted to control the steering mechanism of any mobile vehicle without departing from the scope of the invention.

Both of the bellows 14 and 15 are connected to a source of fluid pressure supply which, in the form shown, comprises Venturi tubes 26 and 27 which during flight of the aircraft produce a suction in the bellows 14 and 15, respectively, the amount of which may be controlled by means of valves 28 and 29 connected in the supply pipes 30 and 31, respectively. The operation of the bellows 14 and 15 is controlled by means of a turn indicator shown diagrammatically at 32, the gyro rotor of which is air operated by means of suction provided from another venturi 33 through the pipes 34 and 35, the control member of said turn indicator being connected to an arm 36 forming part of the valve 37 which provides a leak to the atmosphere for the bellows 14 through pipe connections 38 and 39, and a similar leak for the bellows 15 through the pipe connections 40 and 41. The valve is so constructed and arranged that when the arm 36 moves in one direction an opening 42 is uncovered in a manner to be described hereinafter, thereby opening the bellows 15 to the atmosphere, and upon movement of the arm 36 in the opposite direction a similar opening 43 is uncovered thereby opening the bellows 14 to the atmosphere. When the arm 36 is normally inoperative, i. e., when no turns are taking place, both of the openings 42 and 43 remain completely covered so that the suction on both of the bellows 14 and 15 is equal and consequently the tension on the cables 21 and 22 is equal, the rudder 25 thus remaining in its central position. The amount of leakage through the openings 42 and 43 is varied, as will appear later, by varying the size of said openings by the movement of the arm 36 thereby causing the force produced by the bellows on the cables 21 and 22 to be a function of the rate of turning of the craft as determined by the turn indicator 32. Hence, the movement of rudder 25 by either of the bellows 14 and 15, through the action of either of the leaks 42 and 43 will be a function of the rate of turn, and in effect the operation of the turn indicator causes the force produced on the bellows to anticipate a turn of the craft by immediately acting on the rudder with the same force as the force produced by the turning of the craft.

As has been pointed out above, the control of the rudder by only the turn indicator is insufficient to maintain the craft on a predetermined and desired course since the turn indicator does not respond to the angle of turn or departure of the craft from its course and, therefore, means are provided for introducing a correction factor into the operation of the servo unit, the bellows in the present instance, which factor is a function of said angle of departure, by causing additional leaks from the respective bellows to be opened to the atmosphere in accordance with the value of said angle or the angular distance which the craft is off the course, thereby creating a force on the rudder by the bellows which is proportional to said angle of departure. In the form shown, said means comprise an electrical off-course indicator 44 which is constituted by a double-reading galvanometer electrically connected to and energized by an electrolytic master compass 45 of the type disclosed in the above referred to application of Adolf Urfer, Serial No. 470,451, through leads 46 and 47 connected to a terminal block 48. The compass may be adjusted for a desired course by means of a compass controller, shown at 49, by cranking a handle 50 thereof until the desired course is indicated on a compass card 51 carried by the controller and by a reference mark or lubber's line 52. The controller causes the compass bowl of the compass 45 to be rotated by means of a flexible shaft 53 to the position indicated on the compass card. The craft is then maneuvered until it is on the selected course, at which time a pointer 54 of the off-course indicator 44 will be in its normally central or zero position. Upon a deviation of the craft to the left the pointer will move to the left, and when the craft deviates to the right the pointer moves to the right proportional to the angle that the craft is off the course.

Means are now provided for utilizing this left and right movement of the pointer 54 to provide the additional leaks to the atmosphere of the bellows 14 and 15, the amount of the leakage being proportional to the angle of departure of the craft from a selected course. Said means comprise a shield 55 of any suitable material such, for example, as celluloid, although any other material may be employed which will operate satisfactorily. The shield normally covers both of a pair of elongated orifices or slots 56 and 57 provided in the face or dial of the indicator 44 and are connected by means of pipes 58 and 59 through valves 60 and 61 to the pipes 38 and 40, respectively, and hence to the bellows 14 and 15, respectively, whereby additional leakage of the bellows to the atmosphere takes place when the shield 55 moves to the left or right.

It will now be apparent from the foregoing that as an aircraft on which the novel steering apparatus is mounted moves through the air, a suction is produced by the Venturi tubes 26, 27, and 33, the first two mentioned Venturi tubes causing an evacuation of the bellows 14 and 15, and the third Venturi tube 33 bringing the gyro rotor of the turn indicator 32 up to speed for proper operation thereof on a turning of the craft. Since both of the bellows 14 and 15 are normally closed to the atmosphere they will exert equal pulls on the auxiliary rudder bar 19 through their respective pull rods 17 and 18, thus holding the rudder 25 in a normally central position through the main rudder bar 23 and the cables which connect the rudder to said main rudder bar. If now the craft deviates suddenly to the left, for example, the arm 36 of the turn indicator 32 will move to the left thereby opening the bellows 15 to the atmosphere through the orifice 42 and pipes 40, 41, thereupon the bellows 14 will collapse since the opposing pull of bellows 15 has ceased because a suction no longer exists therewithin due to the leak to the atmosphere, thereby causing the latter bellows to exert a push on the rudder bar 19 corresponding to the pull thereon by the bellows 14, so that the auxiliary rudder bar moves counter-clockwise about its axis 20 and moves the rudder bar 23 in the same direction and thus the rudder 25 is actuated through its connecting cables to the right to return the craft to its course.

The turn indicator 32, however, acts only during the turning movement of the craft and stops as soon as the turning ceases, but the compass repeater pointer 54 is also deflected to the left at the same time that the turn indicator is actuated and remains deflected as long as the craft is off its course and returns gradually to its normal position as the craft returns to its course, thereby causing shield 55 to uncover the elongated orifice or slot 56 by an amount proportional to the value of the angle that the craft has departed from its course so that the bellows 15 continue to be opened to the atmosphere through said slot 56 until the craft gradually comes on its course and any increased turning effect of the craft in the opposite direction is immediately anticipated and prevented by the action of the turn indicator on the bellows. It will be seen that the turn indicator and the compass operate simultaneously on the bellows upon an initial turn and deviation of the craft from its course and continue thereafter to operate simultaneously or independently, and at times in opposite directions, depending upon which is affected and to what extent so that the action on the rudder will be a combined or differential action of the rate and angle of departure or an independent action of either of the turn indicator or the compass depending upon which prevails, thereby bringing the craft back on its course in the same manner as a pilot would.

It is found, however, that when either of the slots 56 or 57 are open the shield 55 tends to stick against the face of the dial of the indicator due to the rush of air through said slots, and the force of the galvanometer was insufficient to move during such time. Therefore, means are provided for periodically cutting off the suction in the pipes 58 and 59 leading to the indicator 44 so that the pointer 54 thereof is enabled to move the shield 55 into the proper position with respect to the slots 56 and 57 in accordance with and corresponding to the position of the magnetic element of the master compass 45. Said means include the valves 60 and 61 and an automatically operated timing mechanism 62 which is actuated by fluid pressure or suction derived from the Venturi tube 33 through a branch pipe 63 and the main supply pipe 34 for intermittently and periodically opening and closing said valves 60 and 61, whereby the suction to the indicator is cut off, and during the time the suction is thus cut off shield 55 can be moved by the pointer 54 so it can assume its proper position. In this manner proper operation of the shield is assured so that the slots 56 and 57 can be opened the correct amount to produce the desired effect on the bellows 14 and 15, thereby introducing the correction factor which is a function of the angle of departure of the craft from its course. This periodic cutting off of the suction to the repeater indicator prevents oscillation of the pointer 54 due to the oscillation of the master compass card, thereby eliminating a tendency of the craft to yaw due to such oscillation. This timing mechanism will be described more fully hereinafter with reference to Figs. 9 to 13, inclusive.

Referring now to Figs. 6 to 8, inclusive, the novel valve 37, which is operated by the turn indicator 32, is constituted by a block 64 having formed therein an arcuate track or run-way 65 in which are provided the leaks or orifices 42 and 43 through which the bellows 15 and 14 are opened to the atmosphere. These openings or orifices are normally held closed by means of strips 66 and 67 of suitable flexible material such, for example, as rubberized cloth, said strips having one of their ends secured to the block at the end of the run-way or track in any suitable manner, as for example, by metal straps 68 and 69 which have formed thereon upwardly projecting portions 70 and 71 serving as stops as will appear later. The other ends of the strips 66 and 67 are secured to arms 72 and 73, respectively, which are loosely mounted on an extension or a shaft 74 of the turn indicator, said shaft being rocked clockwise or counterclockwise by the indicator in accordance with the turns being to the left or to the right. One of these arms, namely, 72 is arranged to be moved to the left while the other arm 73 is arranged to be moved to the right by means of a pin 75 secured to or formed integral with the arm or lever 36 which has heretofore been mentioned and indicated diagrammatically in Fig. 1. The arm or lever 36 is maintained in its normally central position by means of a spring 76 which has one end thereof secured to a fixed support 77 and its other end secured to a pin or screw 78 carried by the arm 36 in one or another of a series of threaded holes 79 depending on the amount of tension it is desired to be exerted by the spring 76 for restoring the arm 36 to its normally central position after it has been actuated by the precession of the gyro rotor (not shown) which is within the casing of the indicator 32. A central stop 80 is provided midway between the extremities of the track 65 and secured to the block 64 to prevent the arms 72 and 73 from exerting an abrupt pull on the rubberized strips 66 and 67 when the arm 36 returns to its normal position, as otherwise the strips would deteriorate rapidly. Means are also provided for preventing oscillation of the lever 36, due to vibration, acceleration or other disturbing forces, and in the form shown comprises a dash pot 81 having a piston 81a therein (Fig. 7) which is connected to the lever 36 by means of a U-shaped bracket 82. The turn indicator 32 is supported by a shelf 83 carried by a pair of upright members 84 and 85 secured to a platform 86, on which is also carried the block 64.

It will be seen, particularly with reference to Fig. 8, that when the arm 36 moves to the right the pin 75 causes the arm 73 to be moved to the right, thereby removing the strip 67 from the opening 43, and the arm 73 is prevented by the stop 71 from being carried off the track. In like manner, if the lever 36 moves to the left pin 75 moves the arm 72 to the left, thereby lifting the strip 66 from the opening 42. Since the openings 42 and 43 are connected to a source of suction, the atmospheric pressure forces the strips 66 and 67 towards the slots which form the openings and effects a tight seal. However, in order to prevent the strips from being sucked into the openings completely, each opening is provided with bridging strips 87 and 88, respectively. The air rushing in through the small openings 42 or 43, when the strips are actuated, tends to equalize the pressure near the strip portion which is opening the aperture and, therefore, by properly dimensioning the apertures and the strips, a novel control valve is produced which does not exert any force onto the respective control arms 72 and 73, and thus is reactionless with respect to said arms. With this novel valve structure the turn indicator is made effective to control the bellows for even very slight rates of turn thus making the steering system more sensitive and accurate in controlling the craft which is steered thereby.

In Fig. 5 there is shown a detailed cross section of the valve 28 taken on line 5—5 of Fig. 4 whereby the amount of suction produced in the bellows 14 or Venturi tube 26 through the pipe 30 may be controlled. The valve 29 is identical in construction and therefore it is necessary to describe only the one. It consists of a cast body portion 87 of some suitable material such as brass or bronze provided with a central bore 88 within which are two concentric bushings 89 and 90. A threaded member 91 is arranged to enter transversely of the valve in order to close up the entire opening or bore or any part thereof by manipulation of a thumb screw 92 secured to or formed integral with the threaded member 91 and prevented from turning due to vibration after an adjustment is made by means of a flat spring 93 secured to the body portion 87 in any suitable manner as by means of a screw 94. By turning the thumb screw 92 in one direction the threaded member 91 recedes from the bore, thereby enlarging the passage to increase the suction within the bellows and to rotate said thumb screw in the opposite direction the bore is closed.

Referring to Figs. 9 to 13 inclusive, the valves and the automatic timing mechanism by which they are controlled for periodically cutting off the suction from the indicator 44 through the pipes 58 and 59 will now be described. The valves 60 and 61 are identical in structure and are made in the form of a single block having two chambers separated by a wall 96. In Fig. 9 there is shown a cross sectional view of the valve 60 taken on the line 9—9 of Fig. 10 showing the chamber 96 of the valve, which chamber is alternately placed in communication with the atmosphere through an opening 97 and with the indicator through the pipe 58 whereby the suction produced therein through the pipe 40 which communicates with the bellows 15 is periodically cut off from the indicator. This periodic interruption of the suction is accomplished by means of a disc valve member 98 secured to or formed integral with a valve stem 99, valve member 98 being arranged to be seated against a valve seat 100 to close the pipe 58. Secured to or formed integral with the valve stem 99 is a flanged disc 101 against which is interposed one end of a coil spring 102, the other end of said spring being seated around the valve seat 100 so that normally the flanged disc 101 maintains the opening 97 closed. Upon a depression of the valve stem 99 against the compression of the spring 102, the passage 97 is opened, thereby admitting atmospheric pressure to the chamber 96 and simultaneously closing the pipe 58 to cut off the suction to the indicator 44.

The novel automatic timing mechanism mentioned hereinbefore is now employed for periodically depressing the valve stem 99 and a similar valve stem 99a of the valve 61. Said automatic timing means is constituted by a single bellows 103 within which a suction is created by the Venturi tube 33 through the pipe lines 63 and 34 shown in Figs. 1 and 3. It will be seen that due to the suction within the bellows 103 the latter will be collapsed by the exterior atmospheric pressure. Means are provided for utilizing this collapsing effect to depress the valve stems 99 and 99a of the valves 60 and 61, and in the form shown comprise an arm 104 secured to the movable wall 105 of the bellows, said arm being bent at right angles to said bellows and having secured thereto or formed integral therewith an extension 106 carrying a finger 107 which bears on the valve stem 99. The bellows 103 are so constructed and arranged that upon the creation of a suction therein the wall 103 moves in the manner of a lever around a pivot formed by the end portion 108 of the bellows so that as the wall 105 moves upwardly the arm 104 and extension 106 moves downwardly, thereby causing the finger 107 to depress the valve stem 99 thus opening the valve to the atmosphere and cutting off the suction in the pipe 58. The valve 61 works in the same manner.

Means are now provided whereby upon complete collapse of the bellows 103 the interior thereof is automatically opened to the atmosphere to permit said bellows to expand, thereby moving the valve wall 105 downward and thus releasing the valve stem 99. Said means comprise a dog 109 which is pivoted at 110 and provided at one end thereof with fingers 111 and 112 and with an enlarged oval-shaped portion 113 at the other end, the latter being arranged upon a rocking movement of the dog 109 about the pivot 110 to alternately open and close an aperture 114 which leads to the interior of the bellows 103. This rocking movement is performed automatically by the collapsing and expanding of said bellows, and for this purpose there is secured to the wall 105 of said bellows a pair of cam-shaped finders 115 and 116 which cooperate with a lever 117 which is pivoted at 118, and together with the dog 109 forms a toggle which is arranged to be actuated by means of a spring 119 having one end thereof connected to the lever 117 by means of a pin 120 and having its other end connected to the pivot 110. The toggle action of the lever 117 by means of the spring 119 causes the dog 109 to be actuated clockwise (Fig. 10) by a pin 121 carried by the lever 117 which, at this instant, engages the finger 111 and causes the dog to be moved counterclockwise when the lever 117 is actuated to the left, at which instant the pin 121 bears against the finger 112.

The cam-shaped fingers 115 and 116 are so constructed and arranged that as the bellows 103 are collapsed, at which time the lever 117 is in the position shown in Fig. 10, the finger 116 strikes against the side of the lever 117 thereby moving it to the left against the tension of the spring 119. As soon as the spring 119 is moved to the left of the pivot 118 the lever 117 is actuated with a rapid snap action so that the pin 121 carried thereby strikes the finger 112 to move the dog 109 counter-clockwise, thus causing the oval-shaped portion 113 to open the aperture 114 as shown in Fig. 11. Upon the opening of the aperture 114 atmospheric pressure enters the bellows 103 causing the latter to expand and upon such expansion the wall 105 begins to move downward and upon reaching its extreme position the cam-shaped finger 115 then strikes the opposite edge of the lever 117 to move it to the right, whereupon the pin 121, by virtue of its engagement with the finger 111, causes the dog 109 to be moved clockwise, thus closing the aperture 114 and causing a suction to again be produced within the bellows 103. In this manner the bellows continually expand and contract automatically thereby periodically operating the valves 60 and 61. A stop is provided in the form of a rod 122 which is also secured to the movable wall 105 of the bellows 103 and has its free end 123 bent internally at right angles towards the bellows to prevent the latter from excessive expansion when the aperture 114 is opened.

There is thus provided a novel timing mechanism for periodically operating the valves 60 and 61 to intermittently cut off the suction to the indicator 44 whereby the operation of the latter is greatly improved and the accuracy of its movement brought to within very fine limits so that substantially no error occurs between the position of the pointer 54 of the indicator and the directional position of the magnetic element of the master compass 45 during the operation of the system.

The operation of the novel directional steering system is as follows: a desired course to be followed by the aircraft is selected, and the master compass 45 is set to said course by turning the crank 50 of the directional controller 49 until the selected course is indicated on the compass card 51. The craft is then manually steered by the pilot through the rudder bar 23 until the craft is on the selected course, at which time the pointer 54 of the off-course indicator 44 is in its normally central position and both the slots 56 and 57 are covered. The pilot now releases the manual control and the craft now will, by virtue of the novel control apparatus, remain on the selected course. Should the craft at any time deviate to the right, for example, the arm 36 of the turn indicator 32 will immediately be actuated to the right as will the pointer 54 simultaneously therewith, thereby opening the bellows 14 to the atmosphere and causing the bellows 15 to collapse. The force which causes the bellows 15 to collapse will be a function of the amount of leakage produced by the opening 43 and the slot 56, which in turn is a function of the angle of departure plus the rate of departure of the craft off its course. Upon collapsing of the bellows 15 the auxiliary rudder 19 is moved clockwise, thereby moving the rudder in a direction opposite to the direction of the deviation, the action of the turn indicator and the compass being on the same bellows so that the rudder is moved to the left with considerable speed. Thus a "meeting" action is produced by the apparatus which is very energetic. The action of the compass begins to decrease at this instant, since the craft is beginning to come back on its course, but the rudder is still moved in the same direction thereof with reduced speed. As the action of the rudder on the craft continues to increase, there will be an instant when the angular velocity of the aircraft is completely checked. At this instant the action of the turn indicator ceases while the action of the compass continues and the "meeting" action still exists but is very small. The angular velocity now occurs in the opposite direction in bringing the craft back to its course, i. e., the craft begins to turn to the left but the compass deviation is still to the right so that the turn indicator is actuated in the opposite direction to open the bellows 15 to the atmosphere, thereby causing an action on the rudder which is a combined differential action on both the bellows 14 and 15. The compass continues to act on the bellows 14 slowly in the same direction as before but begins to gradually die out. Thus the action of the two bellows is a differential action in which the action of the turn indicator is strongly predominant and steadily increasing as the action of the compass diminishes. This will bring the rudder quickly to its central position or even further thus producing the desired "easing" action as is accomplished by a good pilot. In this manner the craft is brought on its course gradually and by virtue of the combined action of the turn indicator and the compass, in the manner set forth above, the craft is prevented from going beyond its course so that a straight course is steered without difficulty and without the attention of the pilot. In the same manner, if the craft deviates in the opposite direction for any reason, the effect produced by the turn indicator and the compass on the servo unit, i. e., the bellows, and hence the rudder, will be in the opposite direction to return the craft to its course.

There is thus provided a novel automatic steering system operated by fluid pressure, and, therefore, particularly suitable for controlling an airplane where a source of fluid pressure in the form of suction is readily available by the use of Venturi tubes. The operation of the novel system is such that the craft is controlled thereby in the same manner as it would be controlled by an expert pilot, who by experience knows how to operate the rudder bar to prevent overswinging of the craft beyond its course. Furthermore, the apparatus for effecting such control is relatively simple and compact and may be easily installed under the pilot's seat and have the pull rods 17 and 18 thereof connected to the usual rudder bar 23. The servo unit or the bellows are so constructed that the pressure exerted thereby is sufficient to operate the rudder, yet of such proportion that it can easily be overcontrolled by the force exerted by the pilot on the main rudder bar, so that in the event it becomes necessary the pilot can easily take over the control of his craft without having to perform any disconnecting or other operations to render the automatic system inoperative.

Although only one embodiment of the invention has been illustrated and described, various changes and modifications, which will now appear to those skilled in the art, may be made without departing from the scope of the invention. For example, the servo unit may be constituted by pistons operating within cylinders in which a suction or other pressure is produced and the pressure on the pistons controlled in the same manner as on the bellows to operate the rudder in accordance with the angle and rate of departure of the craft from its course, by the combined actions of the turn indicator and the compass. Reference is, therefore, to be had to the appended claims for a definition of the limits of the invention.

What is claimed is:

1. The combination in an automatic steering system, of a compass, a turn indicator, and a fluid-pressure operated rudder-controlling means subjected to an intermittent action of the compass and to a continuous action of the turn indicator for returning a craft to its course upon its deviation therefrom.

2. An automatic steering system comprising means responsive to the changes of direction of motion of a craft, means responsive to rate of change in direction of a craft, and fluid-pressure operated rudder-controlling means subjected to a periodic action of said direction responsive means and to a continuous action of said rate responsive means for returning the craft to its course upon a deviation therefrom.

3. The combination with a rudder of a craft to be maintained on a predetermined course, of means for setting and indicating the course, means responsive to changes in said course, means responsive to the rate of change in said course, and means subjected to an intermittent action of said change responsive means and to a continuous action of the rate of change responsive means for controlling the rudder to return the craft to its course.

4. In combination, a rudder, means for controlling the rudder, means responsive to the rate of change of direction of a craft, means operated by said rate of change means for influencing said rudder-controlling means, means responsive to the change in direction of said craft, and means for periodically influencing the rudder-controlling means by said direction responsive means to correct the action of the rate of change means whereby yawing of the craft is prevented.

5. In combination with the rudder of a craft to be maintained on a predetermined course, a source of fluid-pressure produced by the movement of the craft through its sustaining medium, means operated by said fluid-pressure for controlling the rudder, means responsive to the rate of change of direction of said craft for influencing said rudder-controlling means in accordance with the rate of change of direction, means responsive to a change only of direction of said craft, and means for periodically influencing said rudder-controlling means by said direction responsive means whereby the action of the rate responsive means is corrected to prevent oscillation of the craft about its course.

6. An aircraft automatic steering system for maintaining a craft on a predetermined course, including means for creating a suction when the craft is in flight, a rudder, means operated by said suction for controlling said rudder, manual means for controlling said rudder and operatively connected with said suction operated means, the force of the latter being such that the manual means can over-control the effect thereof on the rudder, means responsive to the change of direction of a craft, means responsive to the rate of change of direction of said craft, a reactionless valve operated by said rate responsive means for controlling the suction in said rudder-controlling means, and timing means for periodically introducing the effect of said direction responsive means on said rudder-controlling means to correct the action of said rate responsive means whereby oscillation of the craft about its course is prevented.

7. An aircraft automatic steering system for maintaining a craft on a predetermined course including a rudder, means operated by fluid-pressure created by the flight of said craft for controlling the rudder, a gyroscopic turn indicator also driven by fluid-pressure created by the flight of said craft, a reactionless valve operated by said turn indicator for influencing said rudder-controlling means in accordance with the rate of change of direction of said craft from its course, a compass, a compass controller for establishing a predetermined course, an off-course indicator operated by said compass, and automatic timing means for causing said off-course indicator to periodically influence said rudder-controlling means in accordance with the angular change in direction of the craft to correct the action of the turn indicator on said rudder-controlling means whereby oscillation of the craft about the predetermined course is prevented.

8. An automatic steering system for maintaining an aircraft on a predetermined course including a rudder, a manually operated rudder bar, a pair of bellows operatively connected to said manually controlled rudder bar for operating the rudder independently of the manual control, means for creating a suction in said bellows whereby they maintain the rudder in normally central position and the force thereof acting on the manually controlled rudder bar being such that a pilot can operate the rudder bar independently of the bellows without disconnecting the latter, a turn indicator responsive to the rate of change in direction of the craft, a reactionless valve controlled by the turn indicator for causing a leak to the atmosphere of one or the other of said bellows depending upon the direction of turn whereby the rudder is operated in a direction opposite to the direction of turning in accordance with the rate of turning, an off-course indicator responsive to the angle of departure of the craft from its predetermined course including means for producing a leak of one or the other of said bellows to the atmosphere depending upon the deviation of the craft being in one direction or the other so that the action of the bellows on the rudder is a combined function of the angle and the rate of departure of the craft from its course, and means for periodically closing the leaks of the bellows effected by the off-course indicator.

9. An aircraft automatic steering system comprising a pair of bellows for controlling the rudder of a craft to be maintained on a predetermined course, means for creating a suction within said bellows whereby the latter maintain the rudder in normally central position, a valve having a connection with each of said bellows for opening one or the other of said bellows to the atmosphere whereby the opposite bellows are caused to collapse and actuate the rudder, a turn indicator for operating said valve in accordance with the rate of change of direction of said craft, fluid-pressure means for operating said turn indicator, a compass, a controller for setting the compass to the predetermined course and for indicating the latter, an off-course indicator operated by the compass and having a pointer which is normally in central position when the craft is on the predetermined course, a pair of orifices associated with the indicator and one of which is connected to one of said bellows and the other of which is connected to the other bellows for opening said bellows to the atmosphere but which are normally closed when the craft is on the predetermined course, means carried by the pointer of the off-course indicator for opening one or the other of said orifices depending upon the direction of deviation of the craft off its course and in accordance with the angle of deviation for correcting the action of the turn indicator on said bellows to prevent oscillation of the craft about its course, a valve mechanism for disrupting the connection between the bellows and the orifices, and automatic timing means for periodically operating said valve mechanism in order to prevent the effect of periodic oscillations of the compass being transmitted to the rudder-controlling means thereby preventing additional yawing of the craft due to such compass oscillations.

10. In an automatic steering system for aircraft, the combination with a rudder and a rudder-controlling means, of means for influencing said rudder-controlling means to operate the rudder in accordance with the rate of change of direction of the craft, and means for periodically influencing said rudder-controlling means in accordance with the angle of departure of the craft from its course to correct the action of said rate-controlling means.

11. In an aircraft automatic steering system including fluid-pressure operated rudder-controlling means, means responsive to the rate of change of direction of a craft, and means responsive to the angle of departure of the craft from a predetermined course, the combination with said rate responsive means, of a valve controlled thereby, said valve comprising a block having an arcuate track formed thereon and a pair of apertures therein, said apertures being connected to said fluid-pressure operated means for placing the latter in communication with the atmosphere to influence the action thereof on the rudder, a pair of arms associated with the rate responsive means, a strip of flexible material for each of said apertures normally covering the latter, each of said strips having one end thereof secured to the block and the other end secured to the two arms, respectively, and a third arm carried by the rate responsive means and adapted to be moved by the latter for actuating one or the other of the first two mentioned arms so that one or the other of the strips of flexible material uncovers its cooperating aperture.

12. In an aircraft automatic steering system including fluid-pressure operated rudder-controlling means, means responsive to the rate of change of direction of a craft, and means responsive to the angle of departure of the craft from a predetermined course, the combination with said rate responsive means of a reactionless valve controlled thereby, said valve comprising a member having a pair of apertures therein and connected to the fluid-pressure operated means for placing the latter in communication with the atmosphere, a flexible member for each of said apertures and normally covering the latter, and means rendered effective upon actuation of the turn indicator for moving one or the other of said flexible members to uncover its associated aperture.

13. In an aircraft automatic steering system including fluid-pressure operated rudder-controlling means, means responsive to the rate of change of direction of a craft, and means responsive to the angle of departure of the craft from a predetermined course, the combination with said last-mentioned means of an automatic timing mechanism for periodically interrupting said last-mentioned means, said timing means comprising a bellows having an opening to the atmosphere which is normally closed, means for producing a suction within said bellows to cause the latter to collapse, and means effective upon collapsing of said bellows to uncover said opening whereby said bellows are caused to expand and to cover said opening upon the expansion of said bellows, whereby expansion and contraction of said bellows is effected automatically.

14. In an aircraft automatic steering system including rudder-controlling means, means responsive to the rate of change of direction of a craft for influencing said rudder-controlling means to operate the rudder of the craft in accordance with said rate, and direction responsive means also influencing said rudder-controlling means in accordance with the angle of departure of the craft from a predetermined course to correct the action of the rate responsive means, the combination with said direction responsive means of means for rendering the influence of said direction responsive means ineffective, and automatic means for intermittently operating said last-mentioned means.

15. The combination with a rudder of a craft to be maintained on a predetermined course, of means for setting and indicating the course, means for controlling the rudder, means responsive to the rate of change of direction of the craft from the set course, means operated by said rate of change means for influencing said rudder-controlling means, means responsive to the change in direction of said craft from the set course, and means for periodically influencing the rudder-controlling means by said direction responsive means to correct the action of the rate of change means whereby yawing of the craft is prevented.

16. In combination with the rudder of a craft to be maintained on a predetermined course, means for setting and indicating the course, a source of fluid pressure produced by the movement of the craft through its sustaining medium, means operated by said fluid pressure for controlling the rudder, means responsive to the rate of change of direction of said craft for influencing said rudder-controlling means in accordance with the rate of change of direction, means responsive to a change only of direction of said craft, and means for periodically influencing said rudder-controlling means by said direction responsive means whereby the action of the rate responsive means is corrected to prevent oscillation of the craft about its course.

17. The combination in an automatic steering system of a rudder, a compass, means for rotating the compass to set a predetermined course, means for indicating the set course, a turn indicator, means for controlling the rudder, means operated by the turn indicator for influencing the rudder-controlling means, and means for periodically influencing the rudder-controlling means by the compass to correct the action of the turn indicator whereby yawing of the craft is prevented.

18. In combination with the rudder of a craft to be maintained on a predetermined course, a compass, means for rotating the compass to set a predetermined course, means for indicating the set course, a turn indicator, a source of fluid pressure produced by the movement of the craft through its sustaining medium, means operated by said fluid pressure for controlling the rudder, means operated by the turn indicator for influencing the rudder-controlling means, and means for periodically influencing said rudder-controlling means by the compass to correct the action of the turn indicator whereby yawing of the craft is prevented.

19. An aircraft automatic steering system for maintaining a craft on a predetermined course, including means for setting and indicating the predetermined course, means for creating a suction when the aircraft is in flight, a rudder, means operated by said suction for controlling said rudder, manual means for controlling said rudder and operatively connected with said suction operated means, the force of the latter being such that the manual means can over-control the effect thereof on the rudder, means responsive to the change of direction of a craft, means responsive to the rate of change of the direction of said craft, means operated by the rate responsive means for controlling the suction in said rudder-controlling means, and means for periodically introducing the effect of said direction responsive means on said rudder-controlling means to correct the action of said rate responsive means whereby oscillation of the craft about its course is prevented.

20. An aircraft automatic steering system for maintaining a craft on a predetermined course, including means for setting and indicating said predetermined course, means for creating a suction when the craft is in flight, a rudder, means operated by said suction for controlling said rudder, manual means for controlling said rudder and operatively connected with said suction operated means, the force of the latter being such that the manual means can over-control the effect thereof on the rudder, a compass, a turn indicator, a valve operated by the turn indicator for controlling the suction in said rudder-controlling means, and timing means for periodically introducing the effect of the compass on said rudder-controlling means to correct the action of said turn indicator whereby oscillation of the craft about its course is prevented.

21. An aircraft automatic steering system for maintaining a craft on a predetermined course, including a rudder, automatic means for controlling said rudder, manual means for controlling said rudder and operatively connected with said automatic means, the force of the latter being such that the manual means can over-control the effect thereof on the rudder, means responsive to the change of direction of the craft, means responsive to the rate of change of direction of said craft, means operated by said rate responsive means for controlling said automatic rudder-controlling means, and means for periodically introducing the effect of said direction responsive means on said automatic rudder-controlling means to correct the action of said rate responsive means whereby oscillation of the craft about its course is prevented.

22. The combination in an automatic steering system for aircraft, of a rudder, a compass, means for rotating the compass to set a predetermined course, means operatively connected with said setting means for indicating the set course, means for creating a suction when the craft is in flight, means operated by said suction for controlling said rudder, manual means for controlling said rudder and operatively connected with said suction operated means, the force of the latter being such that the manual means can over-control the effect thereof on the rudder, a turn indicator operated by the suction, means operated by the turn indicator for controlling the suction in said rudder-controlling means, and means for periodically introducing the effect of the compass on said rudder-controlling means to correct the action of the turn indicator whereby yawing of the craft is prevented.

23. An aircraft automatic steering system including means for creating a suction when the craft is in flight, a rudder, means operated by said suction for controlling said rudder, manual means for controlling said rudder and operatively connected with said suction operated means, the force of the latter being such that the manual means can over-control the effect thereof on the rudder, means responsive to the change of direction of the craft, means responsive to the rate of change of direction of said craft, means operated by said rate responsive means for controlling the suction in said rudder-controlling means, and means operated by the suction for periodically introducing the effect of said direction responsive means on said rudder-controlling means to correct the action of said rate responsive means whereby yawing of the craft is prevented.

24. An aircraft automatic steering system including a rudder, means operated by fluid pressure created by the flight of said craft for controlling the rudder, a gyroscopic turn indicator also driven by the fluid pressure created by the flight of said craft, a reactionless valve operated by said turn indicator for influencing said rudder-controlling means in accordance with the rate of change of direction of said craft from its course, a compass, a compass controller for establishing a predetermined course, an off-course indicator operated by said compass, and automatic timing means also operated by fluid pressure for causing said off-course indicator to periodically influence said rudder-controlling means in accordance with the angular change in direction of the craft to correct the action of the turn indicator on said rudder-controlling means whereby yawing of the craft is prevented.

25. In an aircraft automatic steering system including rudder-controlling means, means responsive to the rate of change of direction of a craft for influencing said rudder-controlling means to operate the rudder of the craft in accordance with said rate, and direction responsive means influencing said rudder-controlling means in accordance with the angle of departure of the craft from a predetermined course to correct the action of the rate responsive means, the combination with said direction responsive means, of means for rendering the influence of said direction responsive means ineffective, and fluid pressure means for intermittently operating said last-mentioned means.

26. In an aircraft automatic steering system including fluid pressure operated rudder-controlling means, means responsive to the rate of change of direction of a craft for influencing said rudder-controlling means to operate the rudder of the craft in accordance with said rate, and direction responsive means influencing said rudder-controlling means in accordance with the angle of departure of the craft from a predetermined course to correct the action of the rate responsive means, the combination with said direction responsive means, of means for rendering the influence of said direction responsive means ineffective, and automatic fluid pressure operated means for intermittently operating said last-mentioned means.

27. The combination in an automatic steering system, of a rudder of the craft to be steered, a compass, a turn indicator, fluid pressure operated rudder-controlling means subjected to the combined action of the compass and of the turn indicator for returning the craft to its course upon its deviation therefrom, manual means for controlling said rudder and operatively connected with said fluid pressure operated means, and means for adjusting the force of the latter to a value such that the manual means can over-control the effect thereof on the rudder.

28. An automatic steering system comprising, a rudder of the craft to be steered, means responsive to the changes of direction of motion of the craft, means responsive to the rate of change in direction of said craft, fluid pressure operated rudder-controlling means subjected to the combined action of both of said means for returning the craft to its course upon a deviation therefrom, manual means for controlling said rudder and operatively connected with said fluid pressure operated means, and means for adjusting the force of the latter to a value such that the manual means can over-control the effect thereof on the rudder.

29. The combination with a rudder of a craft to be maintained on a predetermined course, of means for setting and indicating said course, means responsive to changes in said course, means responsive to the rate of change in said course, means subjected to the combined action of said change and rate of change responsive means for controlling the rudder to return the craft to its course, manual means for controlling said rudder and operatively connected with said first controlling means, and means for adjusting the force of said first controlling means to a value such that the manual means can over-control the effect thereof on the rudder.

30. The combination with a rudder of a craft to be maintained on a desired course, of fluid pressure operated means for controlling the rudder in accordance with the angle and the rate of departure of the craft from the predetermined course for returning said craft to said course without over-swinging thereof, manual means for controlling said rudder and operatively connected with said first-mentioned controlling means, and means for adjusting the force of said first-mentioned controlling means to a value such that the manual means can over-control the effect thereof on the rudder.

31. An automatic steering system for craft and including means responsive to the positional elements of the angular deviation of the craft to be steered, means responsive to the dynamical elements of its angular deviation, and means for periodically combining the action of said first means with the action of the second means.

32. An automatic steering system for craft and including means responsive to changes in direction of motion of the craft to be steered, means responsive to variations in the angular velocity of the craft, and means for periodically combining the action of the direction responsive means with the action of the velocity responsive means.

33. An automatic steering system including rudder-controlling means, gyroscopic deviation responsive means, a magnetic compass, and means for periodically combining the action of said compass with the action of said gyroscopic means to operate said rudder-controlling means.

34. The combination in an automatic steering system, of a magnetic compass, a gyroscopic deviation responsive device operative upon a deviation from a predetermined course of the craft to be steered, and fluid pressure operated rudder-controlling means subjected to a periodic action of the compass and to a continuous action of the gyroscopic deviation responsive device.

35. The combination with a rudder of a craft to be maintained on a predetermined course, of means for setting and indicating said course, means for controlling the rudder, gyroscopic means responsive to the deviation of the craft from the set course, means operated by said gyroscopic means for influencing said rudder-controlling means, a magnetic compass controlled by said course-setting means, and means for periodically influencing the rudder-controlling means by the compass to correct the action of the gyroscopic means.

36. In combination with the rudder of a craft to be maintained on a predetermined course, means for setting and indicating the course, a source of fluid pressure produced by the movement of the craft through its sustaining medium, means operated by said fluid pressure for controlling the rudder, gyroscopic means responsive to the deviation of the craft from the set course for influencing said rudder-controlling means, a magnetic compass controlled by said course-setting means, and means for periodically influencing said rudder-controlling means by said magnetic compass whereby the action of the gyroscopic means is corrected to maintain the craft on its course.

37. An aircraft automatic steering system for maintaining a craft on a predetermined course, including means for setting and indicating the predetermined course, means for producing a fluid pressure when the aircraft is in flight, a rudder, means operated by said fluid pressure for controlling said rudder, manual means for controlling said rudder and operatively connected with said fluid pressure operated means, the force of the latter being such that the manual means can overcontrol the effect thereof on the rudder, magnetic means responsive to the change of direction of the craft, gyroscopic means responsive to the deviation of said craft, means operated by the gyroscopic means for controlling the fluid pressure in said rudder-controlling means and means for periodically introducing the effect of said magnetic direction responsive means on said rudder-controlling means to correct the action of said gyroscopic means whereby the craft is maintained on its course.

38. An aircraft automatic steering system for maintaining a craft on a predetermined course, including means for setting and indicating said predetermined course, means for producing a fluid pressure when the craft is in flight, a rudder, means operated by said fluid pressure for controlling said rudder, manual means for controlling said rudder and operatively connected with said fluid pressure operated means, the force of the latter being such that the manual means can overcontrol the effect thereof on the rudder, a compass, a gyroscopic deviation responsive device, a valve operated by the gyroscopic device for controlling the pressure in said rudder-controlling means, and timing means for periodically introducing the effect of the compass on said rudder-controlling means to correct the action of said gyroscopic device whereby the craft is maintained on its true course.

39. An automatic steering system for craft and including rudder-controlling means, gyroscopic deviation responsive means for influencing said rudder-controlling means, a compass, and means for periodically correcting the action of said gyroscopic means by said compass.

ADOLF URFER.
PAUL W. KOCH.